(12) United States Patent
Ueda et al.

(10) Patent No.: US 10,365,418 B2
(45) Date of Patent: Jul. 30, 2019

(54) RETROREFLECTIVE SHEET, LICENSE PLATE, AND MANUFACTURING METHOD THEREOF

(71) Applicant: 3M INNOVATIVE PROPERTIES COMPANY, St. Paul, MN (US)

(72) Inventors: Saori Ueda, Kanagawa-ken (JP); Toshitaka Nakajima, Yamagata (JP); Yorinobu Takamatsu, Kanagawa-ken (JP); Ken Egashira, Kanagawa-ken (JP); Koji Saito, Yamagata (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/537,302

(22) PCT Filed: Dec. 17, 2015

(86) PCT No.: PCT/US2015/066488
§ 371 (c)(1),
(2) Date: Jun. 16, 2017

(87) PCT Pub. No.: WO2016/100733
PCT Pub. Date: Jun. 23, 2016

(65) Prior Publication Data
US 2017/0357039 A1   Dec. 14, 2017

(30) Foreign Application Priority Data
Dec. 18, 2014   (JP) .................................. 2014-256392

(51) Int. Cl.
*G02B 1/04* (2006.01)
*G02B 5/20* (2006.01)
(Continued)

(52) U.S. Cl.
CPC .............. *G02B 5/208* (2013.01); *B60R 13/10* (2013.01); *G02B 1/04* (2013.01); *G02B 5/124* (2013.01)

(58) Field of Classification Search
CPC ................................ G02B 5/208; B60R 13/10
See application file for complete search history.

(56) References Cited

U.S. PATENT DOCUMENTS 2,326,634 A   8/1943   Gebhard
2,407,680 A   9/1946   Palmquist
(Continued)

FOREIGN PATENT DOCUMENTS

JP   H05-155976   6/1993
JP   2004-177764 A   6/2004
(Continued)

OTHER PUBLICATIONS

International Search Report for PCT International Application No. PCT/US2015/066488, dated Mar. 8, 2016, 5 pages.

*Primary Examiner* — Mary Ellen Bowman
(74) *Attorney, Agent, or Firm* — Carlos M. Tellez; 3M IPC

(57) ABSTRACT

The disclosed retroreflective sheet contains a retroreflective layer and a polyurethane surface protecting layer, wherein the surface protecting layer contains at least a reaction product of a polyol with either a polyester backbone or a polycarbonate backbone and a trifunctional or higher aliphatic isocyanate, and the glass transition temperature Tg of the surface protecting layer is 50° C. or higher, and the tan δ of the loss tangent at 120° C. is 0.1 or less.

10 Claims, 3 Drawing Sheets

(51) Int. Cl.
*B60R 13/10* (2006.01)
*C08L 75/04* (2006.01)
*G02B 5/124* (2006.01)

(56) References Cited

U.S. PATENT DOCUMENTS

| | | | |
|---|---|---|---|
| 3,190,178 A | | 6/1965 | McKenzie |
| 4,025,159 A | | 5/1977 | McGrath |
| 5,085,918 A | * | 2/1992 | Rajan ............... B60R 13/10 206/807 |
| 5,117,304 A | | 5/1992 | Huang |
| 5,138,488 A | | 8/1992 | Szczech |
| 5,387,458 A | | 2/1995 | Pavelka |
| 5,450,235 A | | 9/1995 | Smith |
| 5,514,441 A | * | 5/1996 | Pohto ............... C09D 175/06 359/536 |
| 5,605,761 A | | 2/1997 | Burns |
| 5,614,286 A | | 3/1997 | Bacon, Jr. |
| 5,691,846 A | * | 11/1997 | Benson, Jr. ......... B29C 39/148 156/245 |
| 5,959,775 A | * | 9/1999 | Joseph ............... C08G 18/10 359/538 |
| 6,243,201 B1 | | 6/2001 | Fleming |
| 7,422,334 B2 | | 9/2008 | Smith |
| 8,357,741 B2 | * | 1/2013 | Meyer ............... C08K 3/04 524/406 |
| 8,538,224 B2 | | 9/2013 | Lamansky |
| 9,519,087 B2 | | 12/2016 | Nakajima |
| 2002/0086914 A1 | | 7/2002 | Lee et al. |
| 2004/0050936 A1 | * | 3/2004 | Look ............... B60R 13/10 235/462.1 |
| 2007/0209244 A1 | * | 9/2007 | Prollius ............ B60R 13/10 40/209 |
| 2009/0300953 A1 | * | 12/2009 | Frisch ............. B60R 13/10 40/204 |
| 2012/0200710 A1 | | 8/2012 | Nakajima |
| 2015/0191132 A1 | | 7/2015 | Muramoto |
| 2015/0321452 A1 | | 11/2015 | Egashira |
| 2017/0177963 A1 | * | 6/2017 | Pavelka ............ G06K 9/2018 |

FOREIGN PATENT DOCUMENTS

| | | |
|---|---|---|
| WO | WO 95/11464 A1 | 4/1995 |
| WO | WO 2010-121054 | 10/2010 |

* cited by examiner

RETROREFLECTIVE SHEET, LICENSE PLATE, AND MANUFACTURING METHOD THEREOF

CROSS REFERENCE TO RELATED APPLICATIONS

This application is a national stage filing under 35 U.S.C. 371 of PCT/US2015/066488, filed Dec. 17, 2015, which claims the benefit of Japanese Application No. JP 2014-256392, filed Dec. 18, 2014, the disclosure of which are incorporated by reference in their entirety herein.

TECHNICAL FIELD

The present disclosure relates to a retroreflective sheet, a license plate including the retroreflective sheet, and a manufacturing method thereof.

BACKGROUND TECHNOLOGY

Retroreflective materials can return light that enters the material in the direction of the light emitting source. Retroreflective sheets are used in a wide range of applications for traffic safety, personal safety, and the like. Retroreflective sheets are generally used in various articles such as road signs, barricades, license plates, road surface markings, and marking tape, as well as in retroreflective tape for vehicles and clothing.

Two types of retroreflective sheet are known, namely cube corner sheets and microsphere-based sheets. Microsphere-based sheets (also referred to as "bead" sheets) generally retroreflect incoming light rays by using a combination of a plurality of microspheres at least partially embedded in a binder layer, and a mirror reflective or diffuse reflective material (for example, pigment particles, metal flakes, vapor deposition coating, and the like). Cube corner sheets (also referred to as "prism shaped" sheets) generally have a thin transparent layer with a first surface that is essentially flat, and a second structured surface with a plurality of geometric structures, and all or a portion of the structures have three reflective surfaces to form cube corner elements.

In recent years, there have been proposals to use a retroreflective sheet on license plates (also referred to as number plates. Same hereinafter in this disclosure) in order to enhance the visibility of the license plate. On the other hand, automatic license plate reader (ALPR) systems that are installed on roads or proximal thereto are conventionally widely used. ALPR systems typically detect and recognize a vehicle using a camera system. Examples where ALPR systems are used include execution of road and traffic laws, investigations of vehicles involved in crimes, and access control to facilities. An ALPR system typically uses an infrared camera in order to read the number plate, and therefore infrared light is irradiated by the number plate. However, there are cases where the number plate is difficult to read because of halation caused by retroreflecting the infrared light. Therefore, a retroreflective sheet has been proposed that includes an infrared light absorbing agent in order to suppress the halation.

Patent document 1 (Japanese PCT application 2013-508749) discloses "a retroreflective sheet containing a cube corner element, a reflective body layer adjacent to the cube corner element, and an infrared impermeable material".

Patent document 2 (Japanese Unexamined Patent Application 2014-024537) discloses "a sheet for number plate, containing a cesium tungsten oxide, and a substrate".

SUMMARY OF THE INVENTION

License plates, signs, and the like are primarily used outdoors, and therefore preferably have a surface protecting layer that provides weather resistance, grime resistant, chemical resistance, and the like in order to protect the bead sheet, cube corner sheet, graphic layer, color layer, and the like. On the other hand, a forming step of the surface protective layer preferably does not cause degradation of the properties of other layers, particularly the retroreflective properties of the bead sheet or the cube corner sheet.

Generally, the cube corner sheet demonstrates higher retroreflectivity as compared to a microsphere-based sheet. Therefore, cube corner sheets are widely used in many retroreflective sheets because of these high retroreflective properties.

On the other hand, a cube corner element is formed from resin, from the perspective of workability and the like, but the angular position and surface precision required of a prism surface that determines the optical properties are extremely high. A cube corner element made of resin can become deformed by heat. Therefore, when a cube corner sheet is used, the conditions such as the heating temperature, heating time, and the like when manufacturing the graphic layer, color layer, surface protecting layer, and the like on the sheet will affect the angular precision and surface precision, and thus the retroreflective properties of the cube corner element can be degraded.

One embodiment of the present disclosure provides a retroreflective sheet containing a retroreflective layer and a polyurethane surface protecting layer, wherein the surface protecting layer contains at least a reaction product of a polyol with either a polyester backbone or a polycarbonate backbone and a trifunctional or higher aliphatic isocyanate, and the glass transition temperature Tg of the surface protecting layer is approximately 50° C. or higher, and the tan $\delta$ of the loss tangent at 120° C. is approximately 0.1 or less.

Another embodiment of the present disclosure provides a retroreflective sheet where the retroreflective layer contains cube corner elements.

Another embodiment of the present disclosure provides a license plate with the aforementioned retroreflective sheet.

Yet another embodiment of the present disclosure provides a method of manufacturing a retroreflective sheet, including a step of providing a retroreflective layer, and a step of forming a polyurethane surface protecting layer containing at least the reaction product of a polyol having either a polyester backbone or a polycarbonate backbone, and a trifunctional or higher aliphatic isocyanate, on or above the retroreflective layer, wherein the step of forming the surface protecting layer is such that the initial retroreflective index can be maintained at at least approximately 45% after forming the surface protecting layer. Note that the initial retroreflective index herein refers to the retroreflective index of the retroreflective sheet before forming the surface protecting layer.

Yet another embodiment of the present disclosure provides a method of manufacturing a license plate, including a step of providing a base plate, a step of laminating a retroreflective layer onto the base plate to form a retroreflective laminate plate, a step of embossing or debossing the retroreflective laminate plate, a step of forming a color layer on either the concave parts or convex part of the retroreflective laminate plate that has been embossed or debossed, and a step of forming a polyurethane surface protecting layer so as to cover the retroreflective layer and the color layer, wherein the surface protecting layer contains at least the reaction products of a polyol with either a polyester backbone or a polycarbonate backbone, and a trifunctional or higher aliphatic isocyanate.

DETAILED DESCRIPTION

Figure 1:
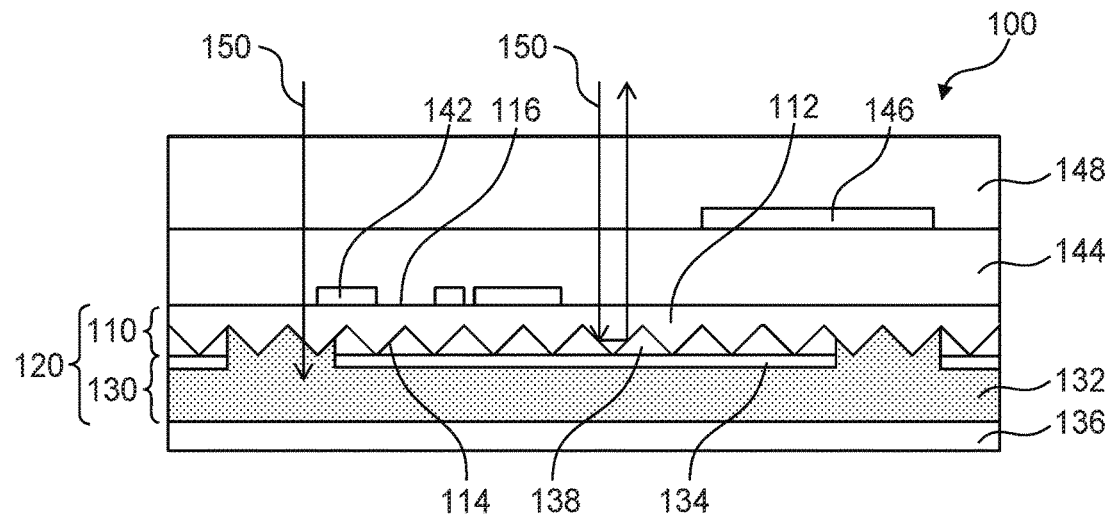
FIG. 1 is a cross-section view of a retroreflective sheet according to an embodiment of the present disclosure.

In the first embodiment, the retroreflective sheet contains a retroreflective layer and a polyurethane surface protecting layer, wherein the surface protecting layer contains at least a reaction product of a polyol with either a polyester backbone or a polycarbonate backbone and a trifunctional or higher aliphatic isocyanate, and the glass transition temperature Tg of the surface protecting layer is 50° C. or higher, and the tan δ of the loss tangent at 120° C. is 0.1 or less.

With the retroreflective sheet of the first embodiment, the retroreflective layer may include cube corner elements.

With the retroreflective sheet of the first embodiment, the retroreflective layer may include bead elements.

With the retroreflective sheet of the first embodiment, the aliphatic isocyanate may be an isocyanurate body or adduct or both of an isophorone diisocyanate.

The retroreflective sheet of the first embodiment may have a color layer between the retroreflective layer and the surface protecting layer, and the color layer may be formed from a thermoplastic ink composition containing a pigment and a copolymer resin containing at least vinyl chloride units and vinyl acetate units.

The retroreflective sheet of the first embodiment may also contain an infrared light absorbing agent.

The retroreflective sheet of the first embodiment may have a retroreflective index of 45 cd/1x/m$^2$ or higher.

The retroreflective sheet of the first embodiment can be used as a road sign, barricade, license plate, road surface marking, or marking tape, as well as a retroreflective tape for vehicles and clothing.

With the retroreflective sheet according to the first embodiment, the retroreflective layer has a main surface and a structured surface on the opposite side as the main surface, and the structured surface contains a plurality of cube corner elements. The retroreflective sheet includes a pressure sensitive adhesive layer with a first region and the second region, wherein the second region contacts with the structured surface, and the first and second regions have sufficiently different properties so as to form a low refractive index layer between the pressure sensitive adhesive layer and the structured surface of the retroreflective layer.

The method of manufacturing a retroreflective sheet related to the present application according to the second embodiment may include a step of providing a retroreflective layer, and a step of forming a polyurethane surface protecting layer containing at least the reaction products of a polyol having either a polyester backbone or a polycarbonate backbone, and a trifunctional or higher aliphatic isocyanate, on or above the retroreflective layer. Furthermore, if the retroreflective index of the retroreflective sheet before forming the surface protecting layer is 100%, the retroreflective index of the retroreflective sheet after forming the surface protecting layer may be 45% or higher.

With the manufacturing method for a retroreflective sheet of the second embodiment, the retroreflective layer may contain cube corner elements.

With the manufacturing method for a retroreflective sheet of the second embodiment, the retroreflective layer may contain bead elements.

With the manufacturing method for a retroreflective sheet of the second embodiment, the step of forming the surface protecting layer includes heating to a temperature of 80 to 120° C. for 10 minutes or less.

With the third embodiment, the manufacturing method for a license plate related to the present application includes a step of providing a base plate, a step of laminating a retroreflective layer onto the base plate to form a retroreflective laminate plate, a step of embossing or debossing the retroreflective laminate plate, a step of forming a color layer on either the concave part or convex part of the retroreflective laminate plate that has been embossed or debossed, and a step of forming a polyurethane surface protecting layer so as to cover the retroreflective layer and the color layer, wherein the surface protecting layer contains at least the reaction products of a polyol with either a polyester backbone or a polycarbonate backbone, and a trifunctional or higher aliphatic isocyanate.

With the manufacturing method for a license plate according to the third embodiment, the retroreflective layer may contain cube corner elements.

With the manufacturing method for a license plate according to the third embodiment, the retroreflective layer may contain bead elements.

A representative embodiment is described below in greater detail while referring to the drawings for the purpose of providing an example, but the present invention is not restricted to these embodiments. With regards to the reference numbers of the drawings, elements that have similar numbers in different drawings indicate similar or corresponding elements.

The definitions of terminology in the present disclosure are as shown below.

"Retroreflective" and "retroreflection" refers to a material property or phenomenon where light from a light source that enters a certain material is reflected back towards the light source.

"Infrared light absorbing agent" refers to a substance or a material that contains the substance where the average transmissivity of light with a wavelength of 800 to 1000 nm is lower than the average transmissivity of light with a wavelength of 400 to 800 nm.

"Transparent" refers to the average transmissivity of light with a specific target wavelength or wavelength band being approximately 60% or higher, preferably approximately 80% or higher, and more preferably approximately 90% or higher.

The retroreflective sheet of an embodiment of the present disclosure includes a retroreflective layer and a polyurethane surface protecting layer. The polyurethane surface protecting layer contains at least a reaction product of a polyol with either a polyester backbone or a polycarbonate backbone and a trifunctional or higher aliphatic isocyanate, and the glass transition temperature Tg of the surface protecting layer is 50° C. or higher, and the tan δ of the loss tangent at 120° C. is 0.1 or less.

The polyurethane surface protecting layer of the present disclosure can provide a retroreflective sheet with the weather resistance and chemical resistance required for outdoor use. Furthermore, forming is possible at a relatively low temperature and in a short amount of time, so degradation of the optical properties of the cube corner element due to the manufacturing conditions can be suppressed. Therefore, a retroreflective sheet with high retroreflectivity and weathering resistance and chemical resistance can be provided.

The retroreflective sheet can be used as a road sign, barricade, license plate, road surface marking, or marking tape, as well as a retroreflective tape for vehicles and clothing.

A cross-sectional view of the retroreflective sheet of an embodiment of the present disclosure is illustrated in FIG. 1. The retroreflective sheet 100 generally has a flat main surface 116 and a retroreflective layer 110 with a structured surface 114 on the opposite side as the main surface. The structured surface 114 has a plurality of cube corner elements 112. An adhesive layer 130 is provided adjacent to the retroreflective layer 110. The adhesive layer 130 includes an adhesive 132 and one or more barrier layers 134, and may also have a liner 136 made of a PET film, polyethylene film, or laminate paper, peel treated with a silicone resin, or the like. The barrier layer 134 has sufficient structural integrity to prevent the adhesive 132 from flowing into a low refractive index layer 138 formed between the structured surface 114 and the barrier layer 134. The barrier layer 134 may be directly bonded to the tip end part of the cube corner elements 112, may be separated from the tip part of the cube corner elements 112, or may be slightly pressed onto the tip part of the cube corner elements 112.

The barrier layer 134 provides a physical "barrier" between the adhesive 132 and the cube corner elements 112, and can form the low refractive index layer 138. Light rays 150 that enter the part of the structured surface 114 adjacent to the low refractive index layer 138 and/or barrier layer 134 can be retroreflected by providing the barrier layer 134. The adhesive layer 130 that is not included in the barrier layer 134 adheres to the cube corner elements 112, thereby effectively sealing the retroreflective region, and forming an optically active region or cell. The adhesive 132 holds together the entire retroreflective structure 120 including the retroreflective layer 110 and the adhesive layer 130, and thereby the need for a separate sealing film and sealing process is eliminated.

As illustrated in FIG. 1, the light rays 150 that enter the cube corner elements 112 adjacent to the low refractive index layer 138 are retroreflected. In the present disclosure, the region of the retroreflective sheet 100 that includes the low refractive index layer 138 is an optically active region. In contrast, the region of the retroreflective sheet 100 that does not include the low refractive index layer 138 essentially does not retroreflect the incoming light rays 150, as illustrated in FIG. 1, and therefore is an optically inactive region.

The low refractive index layer 138 includes material with a refractive index of approximately 1.30 or less, approximately 1.25 or less, approximately 1.2 or less, approximately 1.15 or less, approximately 1.10 or less, or approximately 1.05 or less. Examples of the low refractive index material include air and the low refractive index material disclosed in US patent application No. 61/324,249 (included in entirety herein by reference), for example.

The material of the barrier layer 134 can be any material that can prevent the adhesive 132 from contacting the cube corner elements 112 or penetrating into the low refractive index layer 138. Representative materials that are used for the barrier layer include resin, ultraviolet light curing polymers, films, inks, dyes, pigments, inorganic materials, particles, and beads. The barrier layer may have various dimensions and intervals. In one embodiment, the barrier layer may form a grid, stripe, dot, or text pattern or the like on the retroreflective sheet.

The barrier layer can have various thicknesses, but generally is approximately 2 µm or more, approximately 3 µm or more, and approximately 10 µm or less, approximately 8 µm or less, or approximately 4 µm or less.

Examples of the adhesive 132 that can be favorably used in the adhesive layer 130 include cross-linked plasticized acrylic pressure sensitive adhesives and hot melt pressure sensitive adhesives. Other pressure sensitive adhesives can also be used, including those containing a natural rubber, synthetic rubber, silicone, or other polymer as a base, and including additives as necessary, such as adhesion promoters, antioxidants, ultraviolet light absorbers, plasticizers, and the like. In the present disclosure, the term "pressure sensitive adhesive" refers to an adhesive that has permanent adhesion at room temperature, adheres to various surfaces by light pressure, and that does not exhibit a phase change (from liquid to solid). The adhesive may be cross-linked by thermal cross-linking using a cross-linking agent or by cross-linking using radiation (such as energy beam or ultraviolet light).

The barrier layer may have various thicknesses, but generally is approximately 30 µm or more, approximately 40 µm or more, approximately 50 µm or more, and approximately 150 µm or less, approximately 90 µm or less, or approximately 60 µm or less.

The retroreflective layer 110 includes any suitable cube corner elements 112 that are configured so as to reflect incoming light back in the direction of the light emitting source. The cube corner elements 112 can have any favorable structure that can demonstrate a retroreflective function. For example, the cube corner elements may be perfect cubes (also referred to as full cubes or geometric cubes), truncated cubes, triangular pyramid with a cube corner shape, cavities with a cube corner shape, and the like. For example, the cube corner elements may include three surface structures with three side surfaces that essentially mutually intersect. During use, the retroreflective sheet 100 is normally provided facing the display surface towards the assumed viewer and the light source. The light that enters the display surface enters the retroreflective sheet 100, and is reflected by the each of the three side surfaces of the cube corner elements 112 so as to be discharged from the display surface essentially in the direction facing the light source. In several embodiments, the cube corner elements 112 are inclined with regards to each other in order to enhance the retroreflectivity across a broader range of incoming light ray angles. Exemplary embodiments of the retroreflective sheet based on the cube corners are disclosed in U.S. Pat. No. 5,138,488 (Szczech), U.S. Pat. No. 5,387,458 (Pavelka), U.S. Pat. No. 5,450,235 (Smith), U.S. Pat. No. 5,605,761 (Burns), U.S. Pat. No. 5,614,286 (Bacon), U.S. Pat. No. 5,691,846 (Benson, Jr), and U.S. Pat. No. 7,422,334 (Smith).

Examples of the resin that is preferably used in the retroreflective layer 110 include polycarbonate, polymethylmethacrylate, polyethylene terephthalate, aliphatic polyurethanes, ethylene copolymers, and ionomers thereof. The cube corner elements 112 that are included in the retroreflective layer 110 may be formed by direct molding on a resin film, as disclosed in U.S. Pat. No. 5,691,846 (Benson, Jr), for example. If the retroreflective layer is formed by radiation curing, examples of preferable resins include a cured product of radiation curing compositions containing polyfunctional acrylates, epoxy acrylates, acrylated urethane, and the like. These resins are advantageous for any one or a plurality of thermal stability, environmental stability, transparency, excellent peeling properties from tools and molds, as well as adhesion to other layers, and cured products of polycarbonates and epoxy acrylates are particularly advantageous from the perspective of transparency, thermal stability and the like.

The retroreflective layer may have various thicknesses, but generally is approximately 40 µm or more, approximately 50 µm or more, approximately 55 µm or more, and approximately 150 µm or less, approximately 100 µm or less, or approximately 60 µm or less. The thickness of the retroreflective sheet refers to the distance between the main surface of the retroreflective layer and the highest apex of the structured surface. The cube corner elements layer may have various heights, but generally are approximately 50 µm or more, approximately 70 µm or more, approximately 80 µm or more, and approximately 150 µm or less, approximately 120 µm or less, or approximately 100 µm or less. The height of the cube corner elements refers to the length in the vertical direction with regards to the surface of the retroreflective sheet in the region effective for retroreflection of the side surfaces that form the cube corner elements.

In another embodiment, the present disclosure relates to a method of manufacturing a retroreflective structure 120 that has a retroreflective layer 110, and an adhesive layer 130 made of a barrier layer 134 and an adhesive 132. The adhesive layer 130 includes at least one barrier layer 134 and an adhesive 132. The method of manufacturing includes a step of providing the barrier layer 134 on the adhesive 132, and a step of laminating the adhesive layer 130 that was obtained onto the retroreflective layer 110. The adhesive layer 130 can be formed by various methods including the following representative method, but there is no restriction to this. In one representative embodiment, the material that forms the barrier layer is printed on an adhesive. The printing method may be a noncontact printing method such as printing using an inkjet printer for example, or a contact printing method such as flexographic printing. In another representative embodiment, the material that forms the barrier layer is printed on a smooth peelable surface using an inkjet or screen printing method, for example, and then transferring from the smooth peelable surface to the adhesive. In another representative embodiment, the material that forms the barrier layer is flood coated on a liner that has a micro-structured surface, and then the barrier layer is transferred from the liner with the micro-structured surface to the adhesive, by laminating the adhesive thereon.

As illustrated in FIG. 1, the retroreflective sheet 100 includes a polyurethane surface protecting layer 148 that is transparent in the visible light region and the infrared region (400 nm to 1000 nm). The polyurethane surface protecting layer 148 contains at least a reaction product of a polyol with either a polyester backbone or a polycarbonate backbone and a trifunctional or higher aliphatic isocyanate, and the glass transition temperature Tg thereof is approximately 50° C. or higher, and the tan δ of the loss tangent at 120° C. is approximately 0.1 or less. A polyurethane surface protecting layer 144 that has these properties generally has high cross-linked density, and provides weather resistance and chemical resistance to the retroreflective sheet 100.

The polyurethane surface protecting layer 148 can be formed by applying or spraying a curable composition containing at least a trifunctional or higher aliphatic isocyanate and a polyol having either a polyester backbone or a polycarbonate backbone, as a liquid, onto the retroreflective layer 110 that forms the retroreflective sheet, or on any other optional layer, and then causing the polyol and the isocyanate to react by heating on location. The curable composition containing at least a trifunctional or higher aliphatic isocyanate and a polyol with either a polyester backbone or a polycarbonate backbone can provide reaction products with sufficient strength, weather resistance, and chemical resistance, even though being cured at a relatively low temperature such as approximately 110° C. or less, approximately 100° C. or less, or approximately 80° C. or less. Using this type of curable composition provides cube corner elements side surfaces with the required extremely high angular precision and surface precision, and can form a surface protecting layer where the retroreflectivity of the retroreflective layer is not greatly affected even though the properties of the material are easily affected by heat. With a certain sheet structure, the mutual angles that each of the surfaces that form the cube corner elements face may need to be accurately controlled. High temperatures affect and change these angles, and as a result, the optical properties may differ from the desired requirement properties. Furthermore, in a certain example, a retroreflective structure with an air layer as the low refractive index layer may be very easily subjected to the effects of heat because the structured surface is not physically supported nor protected by another material. Therefore, degradation of the optical properties of the cube corner elements can be suppressed by using the polyurethane surface protecting layer of the present disclosure that can be cured at a relatively low temperature, and thereby high retroreflectivity can be demonstrated. Other lower layers or adjacent layers that are described below, such as a color layer, graphic layer, overlay layer, and the like, can be protected by providing the polyurethane surface protecting layer. In a certain example, the polyurethane surface protecting layer can compensate for insufficient weather resistance and chemical resistance if the weather resistance and chemical resistance of each layer is insufficient. Therefore, each of these layers can also be formed at a relatively low temperature.

In another embodiment, the present method can be performed by coating a curable composition on a liner to form a surface protecting film. The surface protecting layer film attached to the liner can be directly laminated onto the retroreflective layer that forms the retroreflective sheet, or a bonding layer can be interposed therebetween. For example, the surface protecting layer film can be formed beforehand by coating the curable composition onto a liner or the like by knife coating, bar coating, blade coating, doctor coating, roll coating, cast coating, and the like, and then thermal curing if necessary.

The polyol having at least either a polyester backbone or a polycarbonate backbone can include acrylic polyols, polycaprolactone diols, polycaprolactone triols, and other polyester polyols, cyclohexane dimethanol carbonate, 1,6-hexane diol carbonate, and other polycarbonate polyols, and the like, but there is no restriction to these. Examples of these polyols include DURANOL™ G3450J (polycarbonate diol, Asahi Kasei Chemicals Corporation), Desmophen™ A565X (polyester polyol, Sumika Bayer Urethane Co., Ltd.), Desmophen™ A870BA (polyester polyol, Sumika Bayer Urethane Co., Ltd.), and the like.

In several embodiments, the polyol containing at least either a polyester backbone or a polycarbonate backbone accounts for approximately 40% or more, approximately 60% or more, or approximately 80% or more and approximately 100% or less, approximately 95% or less, or approximately 90% or less of the total polyol content included in the curable composition, based on hydroxyl group equivalents.

Preferable examples of the trifunctional or higher aliphatic isocyanate include polyisocyanates such as biurets, isocyanurates, and adducts and the like of hexamethylene diisocyanate (HDI), isophorone diisocyanate (IPDI), 4,4'-methylene biscyclohexyldiisocyanate (also referred to as hydrogenated MDI, H12MDI, and the, like), but there is no restriction to these. Isocyanurates and adducts of isophorone diisocyanate are preferable in order to provide cured product with high weather resistance and chemical resistance. Examples of these aliphatic isocyanates include Desmodur™ Z4470 (isocyanurate of IPDI, Sumika Bayer Urethane Co., Ltd.), DURANATE™ TPA-100 (isocyanurate of HDI, Asahi Kasei Chemicals Corporation), and the like.

In several embodiments, the trifunctional or higher aliphatic isocyanate accounts for approximately 50% or more, approximately 60% or more, or approximately 70% or more, and approximately 100% or less, approximately 90% or less, or approximately 80% or less, of all isocyanate components included in the cured composition, based on isocyanate equivalents.

The curable composition may also contain other polyols that are commonly used in polyurethane compositions, in addition to the polyol having at least either a polyester backbone or a polycarbonate backbone, and may also contain polyisocyanates other than the trifunctional or higher aliphatic isocyanate.

The equivalent ratio of the polyisocyanates and polyols is generally approximately 0.7 equivalents or more, approximately 0.9 equivalents or more, and approximately 2 equivalents or less, or approximately 1.2 equivalents or less of the polyisocyanate, with regards to 1 equivalent of polyol.

The curable composition may include a catalyst. The catalyst can be a catalyst that is generally used for molding polyurethane resins, and examples include di-n-butyl tin dilaurate, zinc naphthenate, zinc octenate, triethylene diamine, and the like. The amount of catalyst used is generally approximately 0.005 mass parts or more, or approximately 0.01 mass parts or more, and approximately 0.5 mass parts or less, or approximately 0.2 mass parts or less, based on 100 mass parts of the curable composition.

The curable composition may also contain organic solvents in order to improve the workability and coating properties and the like, and examples include ketones such as methyl ethyl ketone, methyl isobutyl ketone, acetyl acetone, and the like, aromatic hydrocarbons such as toluene, xylene, and the like, alcohols such as ethanol, isopropyl alcohol, and the like, esters such as ethyl acetate, butyl acetate, and the like, and ethers such as tetrahydrofuran, propylene glycol monomethyl ether, propylene glycol monomethyl ether acetate, dipropylene glycol monomethyl ether acetate, and the like. The amount of organic solvent used is generally approximately 1 mass part or more, or approximately 5 mass parts or more, and approximately 90 mass parts or less, or approximately 80 mass parts or less, based on 100 mass parts of the curable composition.

The curable composition may also contain additives that are conventionally used as other optional components, such as ultraviolet light absorbers, light stabilizers, thermal stabilizers, dispersing agents, plasticizers, flow enhancing agents, leveling agents, and the like.

If the retroreflective sheet is used for an outdoor application, the polyurethane surface protecting layer preferably contains at least one ultraviolet light absorbing agent, light stabilizer, or heat stabilizer. The amount of these additives used can be such that the function of the surface protecting layer and the retroreflective sheet are not excessively lost, and the amount of each component is generally approximately 0.1 mass % or more, or approximately 1 mass % or more and approximately 5 mass % or less, or approximately 3 mass % or less, based on the mass of the surface protecting layer, and the total amount of these components is generally approximately 1 mass % or more, or approximately 3 mass % or more, and approximately 10 mass % or less, or approximately 5 mass % or less.

Specific examples of the ultraviolet light absorbers and light stabilizers include Tinuvin™ PS, Tinuvin™ 99-2, Tinuvin™ 326, Tinuvin™ 328, Tinuvin™ 384-2 (benzotriazole type ultraviolet light absorbers, BASF), Tinuvin™ 400, Tinuvin™ 405, Tinuvin™460 (hydroxyphenyl triazine-based ultraviolet light absorbers, BASF), Uvinul™ 3035, Uvinul™ 3039 (cyanoacrylate-based ultraviolet light absorber, BASF), Tinuvin™ 123, Tinuvin™ 144, Tinuvin™ 152, Tinuvin™ 292 (hindered amine type light stabilizer, BASF), Cyasorb™ UV3529 (hindered amine light stabilizers, Cytec), and Sabostab™ UV64 (hindered amine type light stabilizers, SABO). These ultraviolet light absorbers and light stabilizers can be used individually, or two or more types can be combined and used.

Specific examples of the heat stabilizer include SC-12, SC-308E, SC-320 (Ca/Zn type heat stabilizer, ADEKA), AC-290, AC-294, AC-296, AC-299 (Ba/Zn type heat stabilizer, ADEKA). These heat stabilizers can be used individually, or two or more types can be combined and used.

The polyurethane surface protecting layer containing the reaction products of the curable composition has a glass transition temperature Tg of 50° C. or higher. Tg in the present disclosure refers to the peak temperature of the loss tangent line tan δ (loss elastic modulus E"/storage elastic modulus E') when the viscoelasticity is measured in tension mode, at a frequency of 10.0 Hz, across a temperature range of −40 to 200° C. with a temperature rise rate of 5.0° C./minute. If the Tg of the surface protecting layer is 50° C. or higher, sufficient strength, weather resistance, and chemical resistance can be provided when protecting the lower retroreflective layer and other optionally selected layers.

The loss tangent line δ at 120° C. of the polyurethane surface protecting layer including the reaction products of the curable composition is approximately 0.1 or lower, and in several embodiments, is approximately 0.05 or less, approximately 0.02 or less, or approximately 0.01 or less. The loss tangent line tan δ in the present disclosure refers to the value obtained by measuring the viscoelasticity in Shear mode at a frequency of 0.01 Hz.

The polyurethane surface protecting layer may have various thicknesses, but generally is approximately 10 μm or more, approximately 20 μm or more, approximately 30 μm or more, and approximately 60 μm or less, approximately 50 μm or less, or approximately 40 μm or less.

The retroreflective sheet 100 may include an overlay layer 144, graphic layer 142, color layer 146, and the like, as optionally selected layers or structures, as illustrated in FIG. 1.

The overlay layer 144 may be included in the retroreflective sheet as a protective layer for the lower retroreflective layer 110, or as a support body for the graphic layer 142. Various types of resin films may be used as the overlay layer 144. If the retroreflective sheet is required to have workability, deformability, and the like, the overlay layer preferably has plasticity and/or stretchability. From this perspective, the resin that is preferably used in the overlay layer may include at least one of vinyl chlorides, vinyl chloride-vinyl acetates, urethanes, acrylics, acrylates, olefins, or may include combinations thereof. By using these resins, cracking will not easily occur when the retroreflective sheet is used for manufacturing a license plate, and the retroreflective sheet can favorably track the deformation shape of the emboss part or the deboss part. The overlay layer preferably is transparent to at least visible light.

The overlay layer may have various thicknesses, but generally is approximately 40 μm or more, approximately 50 μm or more, or approximately 60 μm or more, and approximately 200 μm or less, approximately 150 μm or less, or approximately 100 μm or less.

The graphic layer 142 may be used in order to provide decorative or design properties to the retroreflective sheet. If the retroreflective sheet is used for a license plate for example, a picture or pattern may be required on a background part other than the text of the license plate. Examples of the graphic layer include color layers that provide special colors or metallic colors or the like, or pattern layers that provide a pattern such as wood grain, marble grain, and the like, or a logo, picture, and the like to the structure. The color layer can be made, for example, by dispersing an inorganic pigment, organic pigment, luminous material, or the like in a binder resin. In certain embodiments, the graphic layer may include a printed layer formed on the retroreflective layer using an inkjet printer or the like. Alternatively, the printed layer may be formed on the overlay layer. In certain embodiments, the overlay layer contains a vinyl chloride resin. In other embodiments, a metal foil or the like can be used as the overlay layer.

The graphic layer can have various thicknesses, but generally, if a solvent-based ink is used, the thickness is approximately 1 μm or more, or approximately 2 μm or more, and approximately 8 μm or less, or approximately 5 μm or less. If a UV curing ink is used, the thickness may be approximately 1 μm or more, or approximately 5 μm or more, and approximately 50 μm or less, or approximately 30 μm or less.

The color layer 146 primarily provides a readable part containing letters, numbers, and images to the retroreflective sheet, and may be used in order to provide distinctiveness to the retroreflective sheet. For example, when used on a license plate, the retroreflective sheet can be used on the deboss part or emboss part letters or numbers of the license plate. The color layer can generally be formed by applying an ink composition containing pigment and a binder resin onto at least one of the retroreflective layer, overlay layer, or the like by roll coating or the like.

Organic pigments that are conventionally used as pigments can be used. Specific examples of organic pigments include C. I. Pigment quite 6, C. I. pigment black 7, C. I. pigment red 122, C. I. pigment red 202, C. I. pigment red 254, C. I. pigment red 255, C. I. pigment orange 43, C. I. pigment Violet 19, C. I. pigment Violet 23, C. I. pigment blue 15, C. I. pigment blue 15:1, C. I. pigment blue 15:2, C. I. pigment blue 15:3, C. I. pigment blue 15: 4, C. I. pigment Brown 23, C. I. pigment Brown 25, C. I. pigment yellow 74, C. I. pigment yellow 109, C. I. pigment yellow 110, C. I. pigment yellow 128, C. I. pigment green 7, C. I. pigment Green 36, and the like.

Inorganic pigments that are conventionally used as pigments can also be used. Specific examples of inorganic pigments include furnace black, channel black, thermal black, acetylene black, and other carbon blacks, black iron oxide, yellow iron oxide, red iron oxide, ultramarine blue, Prussian blue, cobalt blue, titanium yellow, turquoise, molybdate orange, titanium oxide, and the like. Specifically, titanium oxide has excellent capability for hiding the substrate (base material) that is used for the retroreflective sheet. The titanium oxide can be either rutile or anatase titanium oxide, and commercial examples include Tipaque™ R-820, Tipaque R-830, Tipaque R-930, Tipaque A-100, Tipaque A-220 (manufactured by Ishihara Sangyo Kaisha, Ltd.), Taipyua™ R-105, Taipyua R-960 (DuPont) and the like.

A slurry where the pigment is supported by a resin may also be used in order to enhance the dispersibility of the pigment in the ink composition. Examples of the slurries include Microlith™ Yellow 2040K, Microlith Red 3630K, Microlith Magenta 4535K, Microlith Blue 7080K, Microlith Green 8750K, Microlith Black 0066K, and Microlith White 0022K (BASF), and the like, where pigments are supported by a vinyl chloride-vinyl acetate copolymer resin.

The pigments can be used individually, or two or more types can be combined and used. The amount of pigment used is generally approximately 1 mass part or more and approximately 30 mass parts or less, preferably approximately 2 mass parts or more and approximately 25 mass parts or less, for 100 mass parts of the ink composition.

Binder resins that can be preferably used together with the aforementioned pigments include at least a vinyl chloride-vinyl acetate copolymer resin containing vinyl chloride units and vinyl acetate units, but there is no restriction to these. The vinyl chloride-vinyl acetate copolymer may contain other polymer unit, such as vinyl alcohol units, maleic acid units, hydroxy alkyl acrylic acid ester units, and the like. Specific examples of these binders include SOLBIN™ C, SOLBIN™ CL, SOLBIN™ CNL (vinyl chloride-vinyl acetate copolymer resin, Nissin Chemical Industry Co., Ltd.), SOLBIN™ A, SOLBIN™ AL (vinyl chloride-vinyl acetate-vinyl 1 alcohol copolymer resin, Nissin Chemical Industry Co., Ltd.), UCAR™ Solution Vinyl Resin VYHH (vinyl chloride-vinyl acetate-vinyl alcohol copolymer resin, Dow Chemical Japan Co., Ltd.), UCAR™ Solution Vinyl Resin VAGH (vinyl chloride-vinyl acetate-vinyl alcohol copolymer resin, Dow Chemical Japan Co., Ltd.), UCAR™ Solution Vinyl Resin VMCH (vinyl chloride-vinyl acetate-maleic acid copolymer resin, Dow Chemical Japan Co., Ltd.), UCAR™ Solution Vinyl Resin VMCC (vinyl chloride-vinyl acetate-maleic acid copolymer resin, Dow Chemicals Japan Co., Ltd.), UCAR™ Solution Vinyl Resin VMCA (vinyl chloride-vinyl acetate-maleic acid copolymer resin chloride, Dow Chemicals Japan Co., Ltd.), UCAR™ Solution Vinyl Resin VROH (vinyl chloride-vinyl acetate-hydroxy alkyl acrylic acid ester copolymer resin, Dow Chemicals Japan Co., Ltd.), VINNOL™ E15/45 (vinyl chloride-vinyl acetate copolymer resin, Wacker Chemie AG) and the like.

The binder resin can be used individually, or two or more types can be combined and used. The amount of binder resin used is generally approximately 5 mass parts or more and approximately 50 mass parts or less, preferably approximately 10 mass parts or more and approximately 20 mass parts or less, for 100 mass parts of the ink composition.

The ink composition may also contain organic solvents in order to improve the workability and coating properties and the like, and examples include ketones such as methyl ethyl ketone, methyl isobutyl ketone, acetyl acetone, and the like, aromatic hydrocarbons such as toluene, xylene, and the like, alcohols such as ethanol, isopropyl alcohol, and the like, esters such as ethyl acetate, butyl acetate, and the like, and ethers such as tetrahydrofuran, propylene glycol monomethyl ether, propylene glycol monomethyl ether acetate, dipropylene glycol monomethyl ether acetate, and the like, but there is no restriction to these. The amount of organic solvent used is generally approximately 1 mass part or more, or approximately 5 mass parts or more, and approximately 90 mass parts or less, or approximately 80 mass parts or less, based on 100 mass parts of the ink composition.

The ink composition may also contain additives that are conventionally used as other optional components, such as ultraviolet light absorbers, light stabilizers, thermal stabilizers, dispersing agents, plasticizers, flow enhancing agents, leveling agents, and the like.

If the retroreflective sheet is used for an outdoor application, the ink composition preferably contains at least one ultraviolet light absorber, light stabilizer, and heat stabilizers. The amount of these additives is generally dependent on the purpose of use. Typically, the amount used is generally approximately 0.1 mass % or more, or approximately 0.2 mass % or more and approximately 5 mass % or less, or approximately 3 mass % or less, based on the mass of the ink composition, and the total amount of these components is generally approximately 0.1 mass % or more, or approximately 0.2 mass % or more, and approximately 5 mass % or less, or approximately 3 mass % or less.

Specific examples of the ultraviolet light absorbers and light stabilizers include Tinuvin™ PS, Tinuvin™ 99-2, Tinuvin™ 326, Tinuvin™ 328, Tinuvin™ 384-2 (benzotriazole type ultraviolet light absorbers, BASF), Tinuvin™ 400, Tinuvin™ 405, Tinuvin™460 (hydroxy phenyl triazine-based ultraviolet light absorbers, BASF), UVinul™ 3035, Uvinul™ 3039 (cyanoacrylate-based ultraviolet light absorbing agent, BASF), Tinuvin™ 123, Tinuvin™ 144, Tinuvin™ 152, Tinuvin™ 292 (hindered amine type light stabilizer, BASF), Cyasorb™ UV3529 (hindered amine light stabilizers, Cytec), and Sabostab™ UV64 hindered amine type light stabilizers, SABO). These ultraviolet light absorbing agents and light stabilizers can be used individually, or two or more types can be combined and used.

Specific examples of the thermal stabilizer include SC-12, SC-308E, SC-320 (Ca/Zn type heat stabilizer, ADEKA), AC-290, AC-294, AC-296, AC-299 (Ba/Zn type heat stabilizer, ADEKA). These heat stabilizers can be used individually, or two or more types can be combined and used.

The color layer may have various thicknesses, but generally is approximately 5 μm or more, approximately 6 μm or more, approximately 50 μm or more, and approximately 30 μm or less, approximately 25 μm or less, or approximately 20 μm or less.

The ink composition preferably is a thermoplastic ink composition containing pigment and a copolymer resin containing at least vinyl chloride units and vinyl acetate units. The term "thermal plasticity" used for the ink composition in the present disclosure refers to the color layer formed from the ink composition having thermal plasticity. In several embodiments, the thermoplastic ink composition does not include a cross-linking agent or a curing agent. The color layer formed from the thermoplastic ink composition is relatively more flexible than a color layer formed from a heat curable or radiation curable ink composition, and therefore deformation will easily occur when processing or molding the retroreflective sheet, and there will be advantages in that appearance defects such as cracks or the like due to temperature change when using the retroreflective sheet will not easily occur. If a cross-linking agent and/or a curing agent is not included, a thermal curing process will not be necessary, and therefore the color layer can be formed at a relatively low temperature, such as approximately 110° C. or less, approximately 100° C. or less, or approximately 80° C. or less. By combining the color layer formed from the thermoplastic ink composition and the polyurethane surface protecting layer of the present disclosure, the aforementioned advantages can be achieved while obtaining a retroreflective sheet with excellent weather resistance and chemical resistance.

The retroreflective sheet may also contain an infrared light absorbing agent. In this case, the infrared light absorbing agents may be included in any layer along the path of the light that enters and is reflected in the retroreflective sheet. For example, the infrared light absorbing agent may be included in the retroreflective layer (for example in the retroreflective elements, substrate layer (body layer), sealing film, adhesive layer, and the like), polyurethane surface protecting layer, or in an optionally added layer such as the overlay layer, graphic layer, or color layer. An infrared light absorbing layer (not illustrated in the drawings) containing an infrared light absorbing agent and a binder resin may also be provided on the polyurethane surface protecting layer, or between the polyurethane surface protecting layer and the retroreflective layer. In one embodiment, the infrared light absorbing agent is included in the retroreflective layer. The average transmissivity for light with a wavelength of 800 to 1000 nm of the layer that contains the infrared light absorbing agents is preferably approximately 80% or less, approximately 70% or less, or approximately 60% or less. The average transmissivity for light with a wavelength of 800 to 1000 nm of the layer that contains the infrared light absorbing agents may be approximately 0.5% or more, approximately 1% or more, or approximately 5% or more.

When infrared light enters the retroreflective sheet containing the infrared light absorbing agent at any incident angle, the infrared light is absorbed by the layer containing the infrared light absorbing agent, and thus retroreflection of the infrared light is suppressed. This type of retroreflective sheet is particularly useful for license plates that are required to have visibility to ALPR infrared systems.

The infrared light absorbing agent can be a material that absorbs near infrared light radiation (for example, wavelength of approximately 760 nm to approximately 1500 nm), and examples include ultraviolet light absorbing colorants such as cyanine compounds, phthalocyanine compounds, dithiol metal complexes, naphthoquinone compounds, diimonium compounds, azole compounds, and the like, and infrared light absorbing pigments such as cesium tungstenate compounds (CWO), antimony doped tin oxides (ATO), tin doped indium oxide (ITO), titanium oxide, zirconium oxide, tantalum oxide, niobium oxide, zinc oxide, indium oxide, tin oxide, cesium oxide, zinc sulfate, and the like. The infrared light absorbing agent preferably contains a cesium tungstenate compound because the weather resistance will be particularly excellent. Cesium tungstenate compounds have a deep blue color, but are advantageous from the perspective that the required infrared light absorption can be maintained without affecting the background color (base color) by appropriately adjusting the concentration.

The cesium tungstenate compound preferably has a general formula of $Cs_xW_yO_z$ (in the formula, $0.001 \leq x/y \leq 1$, and $2.2 \leq z/y \leq 3.0$). More preferably, $0.1 \leq x/y \leq 1$, and $2.45 \leq z/y \leq 3$.

The average particle diameter of the cesium tungstenate compound is preferably approximately 300 nm or less, or approximately 100 nm or less, or approximately 50 nm or less, from the perspective of dispersibility, and the visibility of the background color (base color) in the visible light region. The average particle diameter of the cesium tungstenate compound may be approximately 10 nm or more, or approximately 20 nm or more.

If an infrared light absorbing agent is included in the retroreflective sheet, the whiteness of the retroreflective sheet may be reduced. This is because most of the commonly used infrared light absorbing agents exhibit a slight amount of absorption in the visible light region. Therefore, if desired, a whiteness enhancing material such as titanium oxide, zinc oxide, or a fluorescent whitening agent or the like may be included in the retroreflective sheet in order to increase the whiteness of the retroreflective sheet, or the retroreflective sheet may be coated. The retroreflective sheet can be made to appear whiter under sunlight by using a whiteness enhancing material.

The whiteness enhancing material can be included in the retroreflective sheet in various patterns, areas, arrangements, and colors, or can be coated onto the retroreflective sheet. In several embodiments, the whiteness enhancing material is coated onto at least a portion of the retroreflective sheet. Several whiteness enhancing materials may reduce the retroreflective capability of the retroreflective sheet. In this case, a retroreflective sheet with the desired level of retroreflectivity and whiteness can be achieved by controlling the application area of the whiteness enhancing material, as well as the size and density or the like of the various elements that compose the application pattern of the whiteness enhancing material.

A bonding layer may be provided if necessary between the various layers. The bonding layer can be formed from a conventionally known adhesive, and is appropriately selected based on the materials to be bonded. For example, the adhesive can be an adhesive based on acrylic resin, epoxy resin, polyester resin, and the like. Preferably, the bonding layer is transparent to visible light, in order to not have an effect on the retroreflectivity and the visibility of the background color (base color).

The thickness of the bonding layer is not particularly restricted, but generally may be approximately 10 μm or more, or approximately 20 μm or more, and approximately 200 μm or less, or approximately 100 μm or less, for example.

Figure 2:
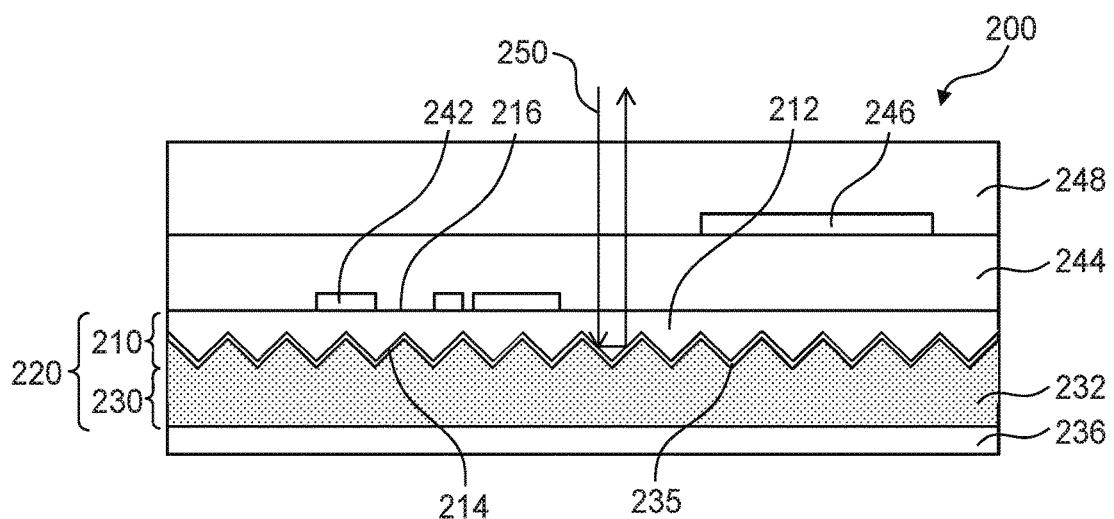
FIG. 2 is a cross-section view of another retroreflective sheet according to an embodiment of the present disclosure.

A cross-sectional view of the retroreflective sheet of another embodiment of the present disclosure is illustrated in FIG. 2. The retroreflective sheet 200 of FIG. 2 has a retroreflective layer 210 that includes a structured surface 214 and a reflective layer 235 adjacent to the structured surface 214. The reflective layer 235 is used in place of the low refractive index layer 138 of FIG. 1. The reflective layer 235 may be an aluminum coating on the structured surface 214, for example. An adhesive layer 230 that includes an adhesive 232 may be provided on the retroreflective sheet 200 adjacent to the reflective layer 235, and the adhesive layer 230 may also have a liner 236 on the opposite side as the retroreflective layer 210. The structured surface 214 has a plurality of cube corner elements 212.

As illustrated in FIG. 2, the light rays 250 that entered the cube corner elements 212 are retroreflected by the combination of the reflective layer 235 and the cube corner elements 212. The region of the retroreflective sheet 210 where the reflective layer 235 is adjacent to the cube corner elements 212 is the optically active region.

The reflective layer 235 preferably has favorable adhesion towards the cube corner elements 212. The reflective layer 235 may be a metal film that is formed by vapor deposition, for example. The vapor deposition metal may be aluminum, silver, or the like. The adhesive force between the vapor deposition metal film and the surface of the cube corner elements 212 may be enhanced by primer processing such as titanium sputtering and the like. It is known that the irradiation angle of the cube corner elements 212 is increased when a metal film is used. In place of the metal film, the reflective layer 235 may include a multilayer reflective coating as described in U.S. Pat. No. 6,243,201 (Fleming) (included in entirety herein by reference). The thickness of the reflective layer 235 generally may be approximately 30 nm or more, or approximately 80 nm or more.

The adhesive layer 230, retroreflective layer 210, polyurethane surface protecting layer 248, overlay layer 244, graphic layer 242, and color layer 246, as well as the infrared light absorbing agent and the whiteness enhancing material are as previously described for the embodiment illustrated in FIG. 1. A sealing film can be applied to the back surface of the cube corner elements, and these are described for example in U.S. Pat. No. 4,025,159 (McGrath) and U.S. Pat. No. 5,117,304 (Huang), which are included in entirety herein by reference. The sealing film allows for total internal reflection at the boundary, and maintains an air boundary that prevents penetration of contaminants such as grime and/or moisture on the back surface of the cubes.

The retroreflectivity of the retroreflective sheet is such that the retroreflective index (in accordance with JIS Z 9117) at an observation angle of 0.2° and an incident angle of 5° is at least approximately 1 cd/1x/m². In a preferable embodiment, the retroreflective index of the retroreflective sheet is approximately 45 cd/1x/m² or higher, or approximately 50 cd/1x/m² or higher. For example, the whiteness defined in ISO 7591:1982 is preferably approximately 45 cd/1x/m² or higher, and the yellowness is approximately 30 cd/1x/m² or higher. For the case of a sealed lens type 1-B-b of JIS Z 9117, the whiteness is preferably approximately 35 cd/1x/m², the yellowness is approximately 25 cd/1x/m², the redness is approximately 25 cd/1x/m², the yellowish redness is approximately 13 cd/1x/m² or higher, the greenness is approximately 5 cd/1x/m² or higher, and the blueness is approximately 3 cd/1x/m² or higher.

The breaking strength of the retroreflective sheet is preferably approximately 5 N/25 mm or higher, approximately 10 N/25 mm or higher, or approximately 200 N/25 mm or higher, from the perspective of favorable or ability, and is preferably approximately 200 N/25 mm or less, approximately 175 N/25 mm or less, or approximately 150 N/25 mm or less, from the perspective of ease of manufacturing. In the present disclosure, the breaking strength is the value measured in accordance with JIS Z 0237.

The elongation of the retroreflective sheet is preferably approximately 30% or more, or approximately 35% or more, from the perspective of preventing the occurrence of cracks during the embossing or debossing process, and preventing lifting from an adherend such as a base plate for example, and the elongation is preferably approximately 400% or less, or approximately 350% or less, from the perspective of having favorable mechanical strength. In the present disclosure, the elongation is the value measured in accordance with ASTM test method D882-80a.

The retroreflective sheet can be fabricated by any commonly known method. An exemplary manufacturing method for a retroreflective sheet according to one embodiment of the present disclosure includes a step of providing a retroreflective layer, and a step of forming a polyurethane surface protecting layer containing at least the reaction products of a polyol having either a polyester backbone or a polycarbonate backbone, and a trifunctional or higher aliphatic isocyanate, on or above the retroreflective layer. In several favorable embodiments, if the retroreflective index of the retroreflective sheet prior to forming the surface protecting layer is 100%, the retention rate of the retroreflective index of the retroreflective sheet after forming the surface protecting layer is at least approximately 75%, at least approximately 60%, at least approximately 70%, or at least approximately 80%.

A step of forming a polyurethane surface protecting layer can be performed by heating the curable composition at a temperature of approximately 20° C. or higher and approximately 120° C. or lower. In several favorable embodiments, the heating temperature of the step of forming the polyurethane surface protecting layer may be approximately 100° C. or less, approximately 90° C. or less, or approximately 80° C. or less. The heating time is also dependent on the temperature conditions, but for example, if the temperature is approximately 80° C. or less, the heating time may be approximately 30 minutes or less, approximately 20 minutes or less, or approximately 10 minutes or less. In another embodiment, if the temperature is approximately 100° C., the heating time may be approximately 10 minutes or less, approximately 5 minutes or less, or approximately 2 minutes or less. Forming the surface protecting layer at a relatively low temperature and short period of time provides cube corner elements side surfaces with the required extremely high angular precision and surface precision, and can form a surface protecting layer where the retroreflectivity of the retroreflective layer is not greatly affected even though the properties of the material are easily affected by heat. A retroreflective structure with an air layer as the low refractive index layer is very easily subjected to the effects of heat because the structured surface is not physically supported nor protected by another material. Therefore, great benefits can be achieved by forming the surface protecting layer at a relatively low temperature and short period of time, in this manner.

The present of the polyurethane surface protecting layer enables formation of the other various layers such as the color layer, graphic layer, overlay layer, and the like at relatively low temperatures, for example essentially the same temperature as the temperature used when forming the surface protecting layer. Furthermore, the presence of the polyurethane surface protecting layer means that the lower layers do not need to independently have weather resistance or chemical resistance. In other words, these various layers can be formed in a step after formation of the retroreflective laminate body at temperature conditions of approximately 100° C. or less, approximately 90° C. or less, or approximately 80° C. or less, where there is essentially no degradation of the optical properties of the cube corner elements. The heating time is also dependent on the temperature conditions, but for example, if the temperature is approximately 80° C. or less, the heating time may be approximately 30 minutes or less, approximately 20 minutes or less, or approximately 10 minutes or less, and if the temperature is approximately 100° C., the heating time may be approximately 10 minutes or less, approximately 5 minutes or less, or approximately 2 minutes or less.

In several embodiments, the retroreflective sheet is fabricated by successively laminating or applying the layers and elements that form the retroreflective sheet of the present disclosure. The retroreflective sheet that is obtained can be used to form an article such as a license plate, sign, or the like by attaching to an adherend such as an aluminum plate, for example. In another embodiment, an article where the adherend and the retroreflective sheet are integrally formed, such as a license plate, sign, or the like, for example, can be formed by attaching a portion of a layer of the retroreflective sheet on the adherend (substrate), for example an aluminum plate, and then laminating or applying thereon the other layers and elements of the retroreflective sheet.

One embodiment of the present disclosure provides a license plate with the aforementioned retroreflective sheet.

The base plate of the license plate is generally a metal plate or a resin plate. The metal plate may be an aluminum plate, stainless steel plate, steel plate, or the like. Examples of a resin plate include polycarbonate plates, polyester plates, vinyl chloride plates, and the like. If necessary, these plates can be molded to the shape of the frame or the like.

For example, license plates and assigns such as traffic signs and the like generally include text combining letters and numbers, graphics, patterns, and combinations thereof. In certain embodiments, the appearance of the sign is specified by a government and/or a jurisdictional area. In other embodiments, the display part can be formed by a color layer. In yet other embodiments such as license plates for example, the display part can be formed by combining and emboss part (convex part) or a deboss part (concave part) and a color layer. The depth of the emboss part and the deboss part is generally approximately 1 mm or more, and approximately 2 mm or less, but there is no restriction to this.

The manufacturing method for a license plate according to one embodiment of the present application includes a step of providing a base plate, a step of laminating a retroreflective layer onto the base plate to form a retroreflective laminate plate, a step of embossing or debossing the retroreflective laminate plate, a step of forming a color layer on either the concave parts or convex parts of the retroreflective laminate plate that has been embossed or debossed, and a step of forming a polyurethane surface protecting layer so as to cover the retroreflective layer and the color layer, wherein the surface protecting layer contains at least the reaction products of a polyol with either a polyester backbone or a polycarbonate backbone, and a trifunctional or higher aliphatic isocyanate.

The method of manufacturing a license plate is described as an example while referring to FIG. 3A through FIG. 3F, but the method of manufacturing a license plate is not restricted to this method.

Figure 3A:
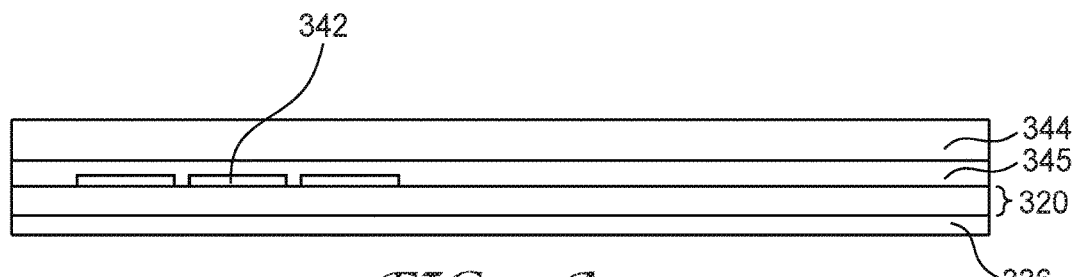
FIG. 3A illustrates the manufacturing procedures of the license plate of the first embodiment the present disclosure, using a cross-section view.

The retroreflective structure illustrated in FIG. 3A has a liner 336 on an adhesive layer (not illustrated in the drawings), a graphic layer 342 is printed on a retroreflective structure 320, and an overlay layer 344 is laminated thereon with a bonding layer 345 interposed therebetween.

Figure 3B:
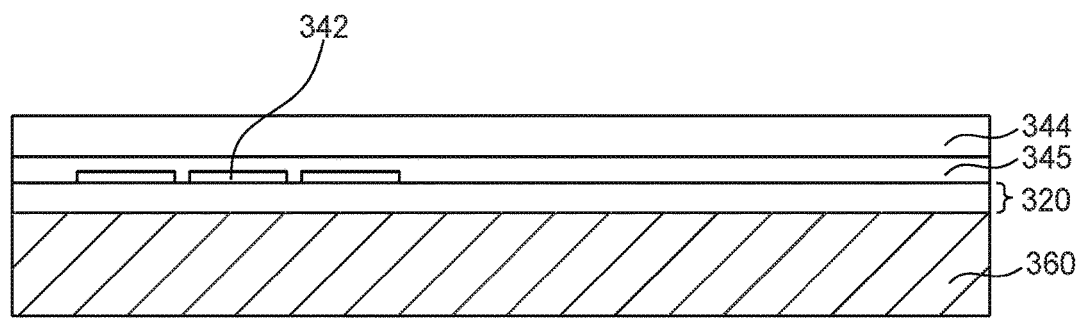
FIG. 3B illustrates the manufacturing procedures of the license plate of the first embodiment the present disclosure, using a cross-section view.

As illustrated in FIG. 3B, a retroreflective laminate plate is formed by removing the liner 336, and then laminating to bond the bonding layer of the retroreflective structure 320 to an aluminum plate 360 which is the base plate.

Figure 3C:
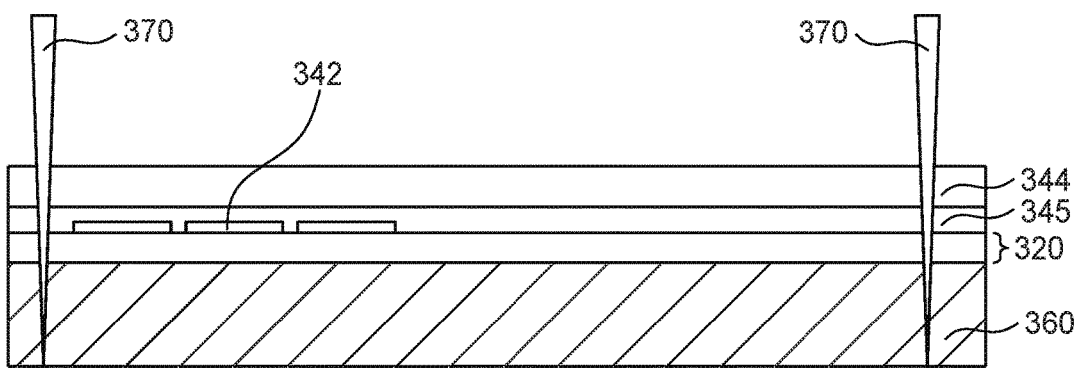
FIG. 3C illustrates the manufacturing procedures of the license plate of the first embodiment the present disclosure, using a cross-section view.

Next, the retroreflective laminate plate is cut by blank pressing to the desired size using a blank press die 370, as illustrated in FIG. 3C.

Figure 3D:
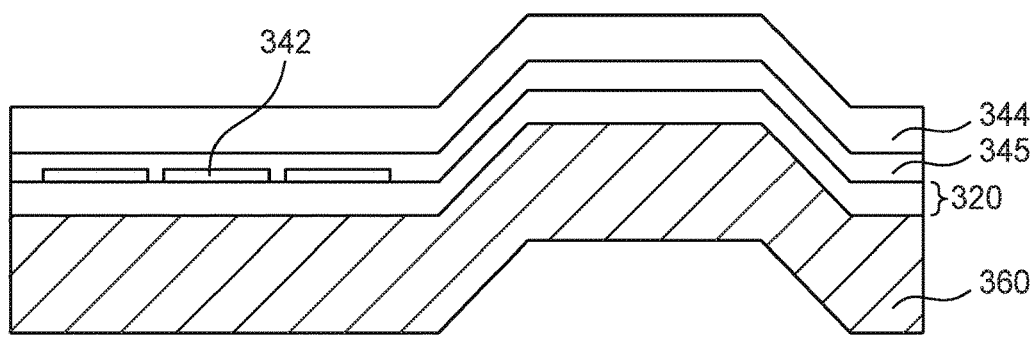
FIG. 3D illustrates the manufacturing procedures of the license plate of the first embodiment the present disclosure, using a cross-section view.

As illustrated in FIG. 3D, the display part and edge frame part of the license plate is formed by embossing/debossing the cut retroreflective laminate plate. In FIG. 3D, the convex part (emboss part) is illustrated as the base for the display part. The frame part can provide strength to the license plate in order to prevent deformation of the license plate.

Figure 3E:
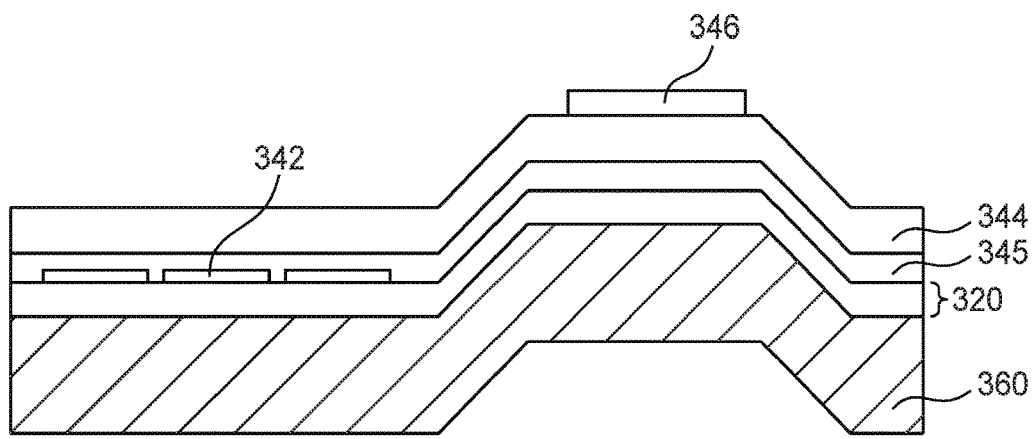
FIG. 3E illustrates the manufacturing procedures of the license plate of the first embodiment the present disclosure, using a cross-section view.

As illustrated in FIG. 3E, a color layer 344 is formed by roll coating or the like on the concave part (emboss part) of the embossed retroreflective laminate plate.

Figure 3F:
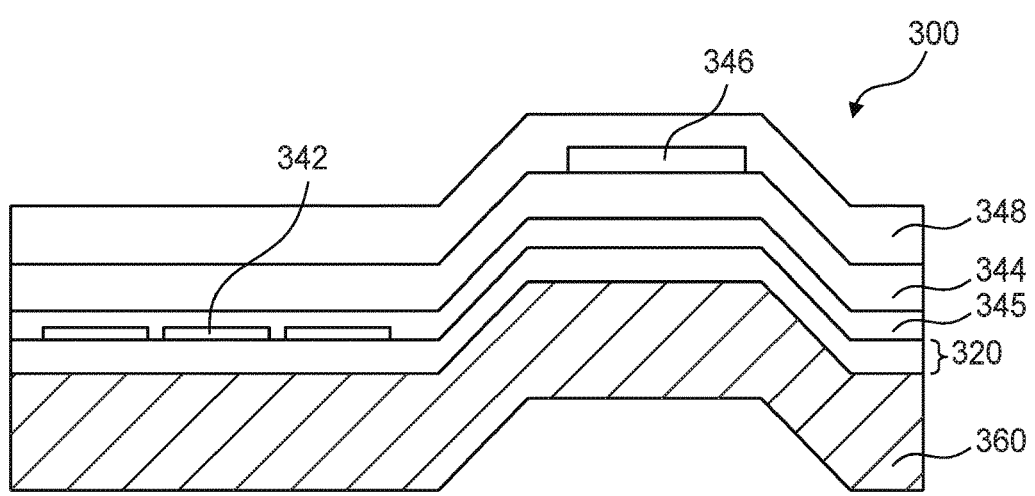
FIG. 3F illustrates the manufacturing procedures of the license plate of the first embodiment the present disclosure, using a cross-section view.

As illustrated in FIG. 3F, a curable composition containing a trifunctional or higher aliphatic isocyanate and a polyol having at least either a polyester backbone or a polycarbonate backbone is applied or sprayed so as to cover the color layer 346 and the retroreflective layer included in the retroreflective structure 320, and then the polyester surface protecting layer 348 is formed by causing the isocyanate and the polyol to react by heating for approximately 10 minutes at a temperature of approximately 80° C. Thereby, a license plate 300 that includes a retroreflective sheet can be fabricated.

In addition to the aforementioned license plate, the retroreflective sheet of the present disclosure can be used, for example, in retroreflective signs (such as traffic control signs, general road signs, highway signs, and the like), delineators, barricades, personal safety products, graphic sheet materials, safety vests, vehicle graphics, display signs, and the like.

Furthermore, a retroreflective sheet primarily using cube corner elements was described as an example in the present disclosure, but the aforementioned polyurethane surface protecting layer can also be formed on a retroreflective sheet (bead sheet) that uses microsphere beads, or in other words bead elements. A microsphere-based sheet typically includes a plurality of microspheres that are at least partially embedded in a binder layer, and a reflective material or a diffusive reflective material that is formed with the microspheres (by metal vapor deposition, sputter coating, metal flakes, pigment particles, and the like). Examples of the bead sheet include retroreflective sheets with exposed lens type beads, retroreflective sheets with sealed lens type beads, retroreflective sheet with encapsulated lens type beads, and the like. A retroreflective sheet with exposed lens type beads is described, for example, in U.S. Pat. No. 2,326,634 (Gebhard). A Gebhard exposed lens type sheet includes a layer of lens elements that are exposed to the air interface. The lens elements preferably have a refractive index of approximately 1.7 to 2.0. Encapsulated bead sheets are disclosed in U.S. Pat. No. 3,190,178 (McKenzie) and U.S. Pat. No. 4,025,159 (McGrath). These patents state that an air interface is maintained on the encapsulated lens type sheet, while at the same time, a cover film is used in order to protect the sheet from exposure to elements (for example water) that may have a negative effect on the optical properties of the sheet. A retroreflective sheet with sealed lens type beads is described, for example, in U.S. Pat. No. 2,407,680 (Palmquist).

EXAMPLES

In the following examples, specific embodiments of the present disclosure are presented as examples, but the present invention is not restricted to these. The terms parts and percent are all based on weight, unless otherwise expressly noted.

In this example, the material that is used for the polyurethane surface protecting layer is illustrated as surface 1, and the material that is used as the color layer is illustrated as surface 2.

TABLE 1

| Product Name or Abbreviation | Description | Source |
| --- | --- | --- |
| DURANOL (TM) G3450J | Polycarbonate diol | Asahi Kasei Chemicals Corporation (Chiyoda-ku, Tokyo, Japan) |
| Desmophen (TM) A565X | Polyester polyol | Sumika Bayer Urethane Co., Ltd. (Osaka, Japan) |
| Desmophen (TM) A870BA | Polyester polyol | Sumika Bayer Urethane Co., Ltd. (Osaka, Japan) |
| Desmodur (TM) Z4470 | Isocyanurate of isophorone diisocyanate (IPDI) | Sumika Bayer Urethane Co., Ltd. (Osaka, Japan) |
| DURANATE (TM) TPA-100 | Isocyanurate of hexamethylene diisocyanate (HDD) | Asahi Kasei Chemicals Corporation (Chiyoda-ku, Tokyo, Japan) |
| IPDI | Isophorone diisocyanate | Wako Pure Chemical Industries, Ltd. (Osaka, Japan) |
| Tinuvin (TM) 99-2 | Benzotriazole type of ultraviolet light absorbing agent | BASF Japan (Minato-ku, Tokyo, Japan) |
| Tinuvin (TM) 292 | Hindered amine type light stabilizer | BASF Japan (Minato-ku, Tokyo, Japan) |
| Dibutyltin dilaurate | Catalyst | Wako Pure Chemical Industries, Ltd. (Osaka, Japan) |
| BYK (TM) -355 | Leveling agent | BYK Chemie Japan (Shinjuku-ku, Tokyo, Japan) |
| Acetyl acetone | | Wako Pure Chemical Industries, Ltd. (Osaka, Japan) |
| Butyl acetate | | Wako Pure Chemical Industries, Ltd. (Osaka, Japan) |
| PMA | Propylene glycol monomethyl ether acetate | Wako Pure Chemical Industries, Ltd. (Osaka, Japan) |

TABLE 2

| Product Name or Abbreviation | Description | Source |
| --- | --- | --- |
| Uralac (TM) 1049 | Saturated polyester containing isocyanate | DSM Resins (Zwolle, Netherlands) |
| Resimene (TM) 717 | Melamine-formaldehyde resin | Ineos Melamines GmbH (Frankfurt, Germany) |
| Ti-Pure (TM)R960 | C.I. Pigment White 6 | DuPont Corporation (Chiyoda-ku, Tokyo, Japan) |
| Irgazin (TM) Yellow 2 GLTE | C.I. Pigment Yellow 109 | BASF Japan (Minato-ku, Tokyo, Japan) |
| Irgazin (TM) Yellow 2 RLT/3RLTN | C.I. Pigment Yellow 110 | BASF Japan (Minato-ku, Tokyo, Japan) |
| SunFast (TM) Green 264-8142 | C.I. Pigment Green 7 | Sun Chemical (Parsippany, NJ, USA) |

TABLE 2-continued

| Product Name or Abbreviation | Description | Source |
|---|---|---|
| Raven (TM) 1200 | C.I. Pigment Black 7 | Columbia Chemical (Atlanta, GA, USA) |
| UCAR (TM) Solution Vinyl Resin VAGH | Vinyl chloride-vinyl acetate-vinyl alcohol copolymer | Dow Chemical Japan (Shinagawa-ku, Tokyo, Japan) |
| UCAR (TM) Solution Vinyl Resin VYHH | Vinyl chloride-vinyl acetate copolymer | Dow Chemical Japan (Shinagawa-ku, Tokyo, Japan) |
| Cyclohexanone | | Wako Pure Chemical Industries, Ltd. (Osaka, Japan) |
| PMA | Propylene glycol monomethyl ether acetate | Wako Pure Chemical Industries, Ltd. (Osaka, Japan) |
| DPMA | Dipropylene glycol monomethyl ether acetate | Wako Pure Chemical Industries, Ltd. (Osaka, Japan) |
| MIBK | Methyl isobutyl ketone | Wako Pure Chemical Industries, Ltd. (Osaka, Japan) |
| Xylene | | Wako Pure Chemical Industries, Ltd. (Osaka, Japan) |
| Diethanolamine | | |
| UVINUL (TM) 3039 | Ultraviolet light absorbing agent | BASF Japan (Minato-ku, Tokyo, Japan) |
| SC-320 | Heat stabilizer | ADEKA Corporation (Arakawa-ku, Tokyo, Japan) |
| SC-308E | Heat stabilizer | ADEKA Corporation (Arakawa-ku, Tokyo, Japan) |
| 7-oxa-bicyclo[4.1.0] heptane-3-carboxylic acid (7-oxabicyclo[4.1.0] heptane)-3-yl methyl | Epoxy plasticizer | Wako Pure Chemical Industries, Ltd. (Osaka, Japan) |
| Adipate polyester | Polyester plasticizer | ADEKA Corporation (Arakawa-ku, Tokyo, Japan) |
| SF-96 | Surfactant | Shinetsu Chemical Co., Ltd. (Chiyoda-ku, Tokyo, Japan) |

The properties of the surface protecting layers and retroreflective sheets having the surface protecting layer were evaluated using the following test methods.

Measuring viscoelastic properties, glass transition temperature Tg, and tan δ A curable composition was applied onto a release treated polyester film (produced by Teijin DuPont with a thickness of 38 μm and dried for 10 minutes in an oven at a temperature of 80° C., and then the polyester film was removed to produce a polyurethane surface protecting layer with a thickness of 50 μm.

The surface protecting layer that was obtained was cut to a width of 10 mm and a length of 50 mm to produce strip shaped test pieces, and then the loss tangent line (tan δ) (loss elastic modulus E"/storage elastic modulus E') was measured in Tension Mode, at a frequency of 10.0 Hz and a temperature rise rate of 5.0° C./minute across a temperature range of −40 to 200° C. using a viscoelasticity measuring device RSA-III produced by TA Instrument. The peak temperature of the loss tangent line (tan δ) that was obtained was defined as the glass transition temperature (Tg). If the glass transition temperature Tg was 50° C. or higher, the antiblocking properties were excellent.

Ink Contamination Resistance Evaluation

A line was drawn on the surface protecting layer of a retroreflective sheet formed with a surface protecting layer using a black oil-based marker (Magic Ink Black, Teranishi Industrial Co., Ltd.), and allowed to sit for 6 hours. The ink was wiped off using a cloth (Nippon Paper Crecia Co., Ltd., Kimwipe S-200) soaked with a lacquer thinner (RA-50, Sankyo Chemical Co., Ltd.), and the presence of residual ink and appearance change of the paint film was visually confirmed. Samples without residual ink and appearance change were evaluated as OK, and samples where residual ink or appearance change to the paint film was confirmed were evaluated as NG (Not good).

Antiblocking Properties

The tackiness of the surface protecting layer of a retroreflective sheet formed with a surface protecting layer was confirmed by finger touch. Samples without finger touch tackiness had excellent antiblocking properties.

Retroreflective Index

The retroreflective index $R_{0.2}$ (retroreflective index at an observation angle of 0.2° and an incident angle of 5°) of a retroreflective sheet formed with the surface protecting layer was measured using a retroreflectivity measuring device Retrosign Type 4500 (Delta Light & Optics, Lyngby, Denmark).

Evaluation of Cross-Linking Density

A curable composition was applied onto a release treated polyester film (produced by Teijin DuPont with a thickness of 38 μm and dried for 10 minutes in an oven at a temperature of 80° C., and then the polyester film was removed to produce a polyurethane surface protecting layer with a thickness of 50 μm.

The surface protecting layer that was obtained was laminated to a thickness of 1.5 mm, and then the loss tangent line (tan δ) (loss elastic modulus E"/storage elastic modulus E') at 120° C. was measured in Tension Mode, at a frequency of 10.0 Hz using a viscoelasticity measuring device ARES produced by TA Instrument. If the loss tangent line (tan δ) was lower than 0.1, the cross-linking density was sufficient, and the ink contamination resistance was excellent.

Examples 1 to 4 and Comparative Examples 1 to 2

The various components shown in Table 3 were blended to prepare a curable composition. Mixing was performed at room temperature (approximately 23° C.) by stirring at 1000 RPM for 5 minutes. An aluminum plate (H1050, 1 mm thick) overlaid with a retroreflective sheet (product name "3M™ High Definition Reflective License Plate Sheeting Series, provided by 3M Company, St. Paul, Minn., USA) was embossed, and then coated in 4 passes with the curable composition using air pressure of 0.3 MPa and a stroke of 7 m/minute using a spray coater (produced by Oku Kogyo Co., Ltd.). The sample was heated for 10 minutes in an oven at a temperature of 80° C. to form a surface protecting layer with a thickness of 25 μm on the retroreflective sheet. The evaluation results of the surface protecting layer and the retroreflective sheet having a surface protecting layer are presented in Table 3. Furthermore, the retroreflective index of the retroreflective sheet was measured before and after forming the surface protecting layer to determine the retroreflectivity index retention rate. These results are also shown in Table 3.

TABLE 3

| Curable composition component | | Example 1 | Example 2 | Example 3 | Example 4 | Comparative Example 1 | Comparative Example 2 |
|---|---|---|---|---|---|---|---|
| Polyol | G3450J | 17.97 | 13.29 | 0 | 0 | 21.40 | 24.55 |
| | A565X | 0 | 0 | 22.07 | 10.40 | 0 | 0 |
| | A870BA | O | 6.55 | 5.52 | 21.10 | 0 | 0 |
| Isocyanate | Z4470 | 16.61 | 16.54 | 15.96 | 0 | 0 | 0 |
| | TPA-100 | 0 | 0 | 0 | 11.15 | 11.30 | 0 |
| | IPDI | 0 | 0 | 0 | 0 | 0 | 6.88 |
| Ultraviolet light absorbing agent | Tinuvin (TM) 99-2 | 0.3 | 0.29 | 0.29 | 0.32 | 0.32 | 0.31 |
| Light stabilizer | Tinuvin (TM) 292 | 0.31 | 0.31 | 0.31 | 0.33 | 0.33 | 0.33 |
| Catalyst | Dibutyltin dilaurate | 0.06 | 0.06 | 0.06 | 0.06 | 0.06 | 0.06 |
| Leveling agent | BYK (TM) 355 | 0.03 | 0.03 | 0.03 | 0.03 | 0.03 | 0.03 |
| Solvent | Acetyl acetone | 6.88 | 5.86 | 5.85 | 6.28 | 6.28 | 6.25 |
| | Butyl acetate | 38.56 | 38.05 | 33.28 | 33.55 | 40.18 | 41.06 |
| | PMA | 19.28 | 19.02 | 16.64 | 16.77 | 20.09 | 20.53 |
| Glass transition temperature (° C.) | | 68 | 80 | 90 | 57 | 15 | 23 |
| Cross-link density (tan δ @120° C., 0.01 Hz) | | $5.1 \times 10^{-3}$ | $4.7 \times 10^{-2}$ | $2.3 \times 10^{-3}$ | $4.4 \times 10^{-2}$ | $4.3 \times 10^{-2}$ | 1.0 |
| Ink contamination resistance | | OK | OK | OK | OK | OK | NG |
| Antiblocking properties | | OK | OK | OK | OK | NG | NG |
| Retroreflective index ($R_{0.2}$, cd/1x/m$^2$) | | 79 | 68 | 71 | 66 | 79 | 69 |

Examples 5 to 7 and Comparative Examples 3 to 6

For example 5, 6, and 7, a retroreflective sheet with a surface protecting layer similar to example 1 was prepared, except that the heating conditions were 60° C./10 minutes, 100° C./10 minutes, and 120° C./10 minutes, respectively. Comparative examples 3 through 6 were prepared at the same conditions as example 1 and examples 5 to 7, except that a surface protecting layer was not provided. The retroreflective index evaluation results are presented in Table 4. Furthermore, the retroreflective index of the retroreflective sheet was measured before and after forming the surface protecting layer to determine the retroreflectivity index retention rate. These results are also shown in Table 4.

TABLE 4

| | Example 5 | Comparative Example 3 | Example 1 | Comparative Example 4 | Example 6 | Comparative Example 5 | Example 7 | Comparative Example 6 |
|---|---|---|---|---|---|---|---|---|
| Heating conditions | 60° C./10 minutes | | 80° C./10 minutes | | 100° C./10 minutes | | 120° C./10 minutes | |
| Surface protecting layer | Yes | No | Yes | No | Yes | No | Yes | No |
| Retroreflective index ($R_{0.2}$, cd/1x/m$^2$) | 82 | 81 | 79 | 85 | 58 | 71 | 41 | 54 |
| Retroreflective index retention | 93% | 98% | 91% | 97% | 64% | 79% | 47% | 66% |

Examples 8 to 14 and Reference Examples 1 to 2

An ink composition was prepared by dissolving or dispersing the components shown in Table 5 using a homogenizing mixer (produced by PRIMIX Inc.). The ink composition was prepared by mixing for 30 minutes at 2000 RPM using a homogenizing mixer (produced by PRIMIX Inc.) at room temperature (approximately 23° C.). An aluminum plate (material H1050, thickness 1 mm) overlaid with the retroreflective sheet used in example 1 was embossed. Japanese text was embossed into the aluminum plate. The ink composition was printed in 2 passes on to the embossed plate using a roll coater RM-12 (Sankyo Engineering), and then dried for 10 minutes in an oven at a temperature of 80° C. After drying, a color layer with a thickness of 10 to 15 μm was formed on the embossed part of the aluminum plate. Next, the surface protecting layer solution of Example 1 was applied in 4 passes using a spray coater (Oku Kogyo Co., Ltd.) at air pressure of 0.3 MPa, and a stroke of 7 m/minute. The sample was heated for 10 minutes in an oven at a temperature of 80° C. to form a surface protecting layer with a thickness of 25 μm on the retroreflective sheet under the same conditions as Example 1.

Reference Example 3

A retroreflective sheet with a surface protecting layer and having a color layer on the embossed part was prepared similar to example 7, except that 3M™ Roll Coat Ink 4850 White (3M Company, St. Paul, Minn., USA) was used as the ink.

Penetration of the ink into the surface protecting layer was visually confirmed for the retroreflective sheet of examples 8 through 14 and reference examples 1 through 3, and the results are shown in Table 5.

TABLE 5

| Ink components | Example 8 | Example 9 | Example 10 | Example 11 | Example 12 | Example 13 | Example 14 | Reference Example 1 | Reference Example 2 | Reference Example 3 |
|---|---|---|---|---|---|---|---|---|---|---|
| Uralac 1049 | 0 | 0 | 0 | 0 | 0 | 0 | 0 | 34.99 | 34.99 | 0 |
| Resimene 717 | 0 | 0 | 0 | 0 | 0 | 0 | 0 | 11.67 | 11.67 | 0 |

TABLE 5-continued

| Ink components | Example 8 | Example 9 | Example 10 | Example 11 | Example 12 | Example 13 | Example 14 | Reference Example 1 | Reference Example 2 | Reference Example 3 |
|---|---|---|---|---|---|---|---|---|---|---|
| R960 (Pigment White 6) | 2.92 | 2.92 | 2.92 | 2.92 | 24.76 | 5.1 | 0 | 2.92 | 2.92 | 0 |
| 2 GLTE (PigmentYellow 109) | 0 | 0 | 0 | 0 | 0 | 3.66 | 0 | 0 | 0 | 0 |
| 2 RLT/3 RLTN (PigmentYellow 110) | 3.82 | 3.82 | 3.82 | 3.82 | 0 | 1.11 | 0 | 3.82 | 3.82 | 0 |
| 264-8142 (Pigment Green 7) | 1.25 | 1.25 | 1.25 | 1.25 | 0 | 0 | 0 | 1.25 | 1.25 | 0 |
| Raven 1200 (Pigment Black 7) | 0.22 | 0.22 | 0.22 | 0.22 | 0 | 0 | 2.71 | 0.22 | 0.22 | 0 |
| VAGH | 0 | 0 | 18.37 | 18.37 | 17.42 | 18.76 | 19.33 | 7.18 | 7.18 | 0 |
| VYHH | 18.47 | 18.47 | 0 | 0 | 0 | 0 | 0 | 0 | 0 | 0 |
| Cyclohexanone | 36.04 | 72.08 | 72.18 | 34.88 | 27.7 | 35.03 | 38.35 | 16.31 | 17.54 | 0 |
| PMA | 0 | 0 | 0 | 34.88 | 0 | 0 | 0 | 16.31 | 17.54 | 0 |
| DPMA | 0 | 0 | 0 | 0 | 0 | 0 | 0 | 2.45 | 0 | 0 |
| MIBK | 36.04 | 0 | 0 | 0 | 27.7 | 0 | 38.35 | 0 | 0 | 0 |
| Xylene | 0 | 0 | 0 | 1.93 | 0 | 35.03 | 0 | 1.93 | 1.93 | 0 |
| Diethyl ethanolamine | 0 | 0 | 0 | 0 | 0 | 0 | 0 | 0.49 | 0.49 | 0 |
| UVINUL 3039 | 0.22 | 0.22 | 0.22 | 0.31 | 0.43 | 0.24 | 0.22 | 0.20 | 0.20 | 0 |
| SC-320 | 0 | 0 | 0 | 0 | 0 | 0 | 0 | 0.24 | 0.24 | 0 |
| SC-308E | 0.22 | 0.22 | 0.22 | 0.30 | 0.43 | 0.23 | 0.22 | 0 | 0 | 0 |
| Epoxy plasticizer | 0.40 | 0.40 | 0.40 | 0.56 | 0.78 | 0.42 | 0.41 | 0 | 0 | 0 |
| Polyester plasticizer | 0.40 | 0.40 | 0.40 | 0.56 | 0.78 | 0.42 | 0.41 | 0 | 0 | 0 |
| SF-96 | 0 | 0 | 0 | 0 | 0 | 0 | 0 | 0.02 | 0.02 | 0 |
| 3M Roll Coat Ink 4850 White | 0 | 0 | 0 | 0 | 0 | 0 | 0 | 0 | 0 | 100 |
| Total | 100 | 100 | 100 | 100 | 100 | 100 | 100 | 100 | 100 | 100 |
| Viscosity (mPa · s @ 20° C.) | 1470 | 3300 | 1660 | 1600 | 960 | 1250 | 1010 | 3140 | 3150 | 2500 |
| Ink penetration into surface protecting layer | None | None | None | None | None | None | None | Not checked | Present | Not checked |

It should be obvious to one skilled in the art that various modifications to the above embodiments and examples are possible without departing from the basic principles of the present invention. Furthermore, it should be obvious to one skilled in the art that various modifications and changes to the present invention can be performed without departing from the spirit and scope of the present invention.

What is claimed is:

1. A retroreflective sheet, comprising
a retroreflective layer, and
a polyurethane surface protecting layer,
wherein the surface protecting layer contains at least a reaction product of a polyol with either a polyester backbone or a polycarbonate backbone and a trifunctional or higher aliphatic isocyanate, and the glass transition temperature Tg of the surface protecting layer is 50° C. or higher, and the tan δ of the loss tangent at 120° C. is 0.1 or less;
wherein the retroreflective sheet further comprises an infrared light absorbing agent, and wherein the retroreflective layer comprises optically active regions and optically inactive regions.

2. The retroreflective sheet according to claim 1, wherein the retroreflective layer contains cube corner elements.

3. The retroreflective sheet of claim 1, wherein the aliphatic isocyanate is an isocyanurate body or an adduct or both of an isophorone diisocyanate.

4. The retroreflective sheet of claim 1, further comprising a color layer between the retroreflective layer and the surface protecting layer, wherein the color layer is formed from a thermoplastic ink composition containing a pigment and a copolymer resin containing at least vinyl chloride units and vinyl acetate units.

5. The retroreflective sheet according to claim 1, wherein the infrared light absorbing agent contains cesium tungsten oxide.

6. The retroreflective sheet of claim 1, wherein the retroreflective index is 45 cd/1x/m$^2$ or higher.

7. A license plate, comprising the retroreflective sheet of claim 1.

8. A method of manufacturing a license plate, comprising:
providing a base plate;
laminating a retroreflective layer onto the base plate to form a retroreflective laminate plate;
embossing or debossing the retroreflective laminate plate;
forming a color layer on either the concave part or convex part of the retroreflective laminate plate that has been embossed or debossed; and
forming a polyurethane surface protecting layer so as to cover the retroreflective layer and the color layer,
wherein the surface protecting layer contains at least the reaction products of a polyol with either a polyester backbone or a polycarbonate backbone, and a trifunctional or higher aliphatic isocyanate; and
wherein one of the retroreflective layer or the surface protection layer comprises an infrared light absorbing agent, and
wherein the retroreflective layer comprises optically active regions and optically inactive regions.

9. The method of manufacturing a license plate according to claim 8, wherein the retroreflective layer contains cube corner elements.

10. The retroreflective sheet according to claim 8, wherein the infrared light absorbing agent contains cesium tungsten oxide.

* * * * *

UNITED STATES PATENT AND TRADEMARK OFFICE
CERTIFICATE OF CORRECTION

| | | |
|---|---|---|
| PATENT NO. | : 10,365,418 B2 | Page 1 of 1 |
| APPLICATION NO. | : 15/537302 | |
| DATED | : July 30, 2019 | |
| INVENTOR(S) | : Saori Ueda et al. | |

It is certified that error appears in the above-identified patent and that said Letters Patent is hereby corrected as shown below:

In the Specification

Column 9,
Line 56, delete "octenate" and insert -- octoate --, therefor.

Column 21-22,
Line 4 (Approx.), delete "SoIution" and insert -- Solution --, therefor.
Line 6 (Approx.), delete "SoIution" and insert -- Solution --, therefor.

In the Claims

Column 26,
Line 63, Claim 10, delete "retroreflective sheet" and insert -- method of manufacturing --, therefor.

Signed and Sealed this
Twelfth Day of May, 2020

Andrei Iancu
*Director of the United States Patent and Trademark Office*